May 14, 1963  R. SPIETH  3,089,739
JOURNAL-BEARING BUSHING
Filed Sept. 6, 1960

INVENTOR.
RUDOLPH SPIETH
BY

United States Patent Office 3,089,739
Patented May 14, 1963

3,089,739
JOURNAL-BEARING BUSHING
Rudolf Spieth, Staffelesweg 5–13, Esslingen
(Neckar), Germany
Filed Sept. 6, 1960, Ser. No. 54,103
1 Claim. (Cl. 308—237)

The present invention relates to a journal-bearing bushing and, more specifically, concerns an adjustable journal-bearing bushing.

It is an object of this invention to provide an improved journal-bearing bushing which may be slipped with low tolerance into a cylindrical housing bore and will make it possible first to eliminate the play necessary for the installation of the bushing and subsequently to adjust the running play between the movable portion and the bore for the bushing in a precisely concentric manner.

It is also an object of this invention to provide a journal-bearing bushing of the type set forth in the preceding paragraph which will make it possible easily to adapt the bushing to the respective purpose for which it is to be used.

These and other objects and advantages of the invention will appear more clearly from the following specification in connection with the accompanying drawing, in which.

The adjustable journal-bearing bushing according to the present invention is provided along its outer and inner circumference with radial recesses offset with regard to each other thereby forming dish spring-like supporting rings and end rings. The bushing according to this invention is characterized primarily in that the outer bearing portions will be thinner than the inner bearing portions so that when an axial force will act upon the journal-bearing bushing, the bushing will be somewhat shortened while first the supporting surfaces will widen in radial direction toward the outside until they firmly engage the walls of the bore in the housing, and only thereafter will the running surfaces be narrowed inwardly in radial direction until the desired running play has been obtained. Such a bushing according to the invention has an important advantage over heretofore known journal-bearing bushing constructions in that it represents a simple rotatable member with cylindrical bore and cylindrical outer surface and is adapted, when being installed, with a low fitting tolerance to be slipped into a likewise cylindrical bore in a housing. Furthermore, the bushing according to the invention has the advantage that by tightening a threaded ring first the installation play between the housing bore and the outer diameter of the bushing will be eliminated and only then the running play between the movable portion and the bore in the bushing may be adjusted precisely concentrically. Inasmuch as the adjustment of the running play may be easily effected by hand or automatically in conformity with the occurring heat development to be expected, regardless of whether the shaft extending through the bushing is at a standstill or rotates, the bushing can easily be adapted to the respective purpose of employment.

Figure 1:
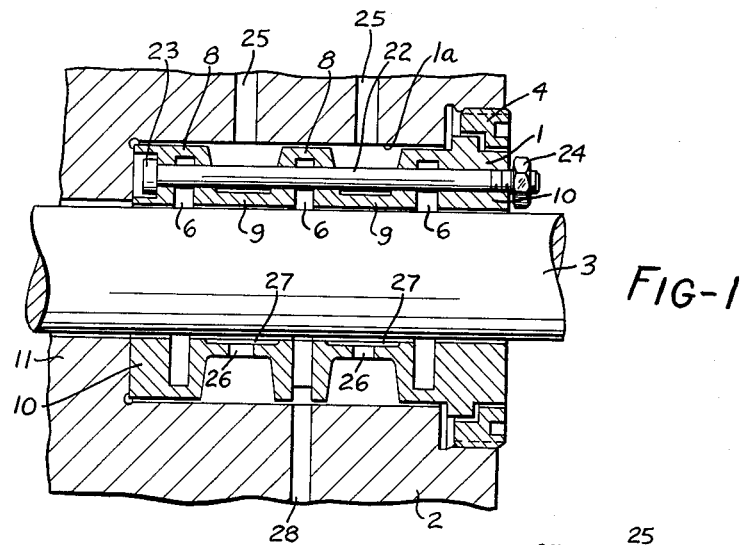
FIGURE 1 is a longitudinal section through a journal bearing bushing according to the present invention with the adjusting ring not yet in tightening position.

Referring now to the drawing in detail and FIG. 1 thereof in particular, this figure illustrates an adjustable journal-bearing bushing 1 mounted in a bore 1a of a housing 2 while a shaft 3 is journalled in said bushing 1. The arrangement furthermore comprises a threaded ring 4 for adjusting purposes as will appear more clearly further below. In FIG. 1 the adjustable journal-bearing bushing 1 is not yet in adjusted position which means that between the outer circumference of shaft 3 and the inner surface of bore 1a there is an installation play of a few hundreds of a millimeter, and a similar play prevails between the bore of the housing 2 and the outer diameter of the bushing.

Figure 2:
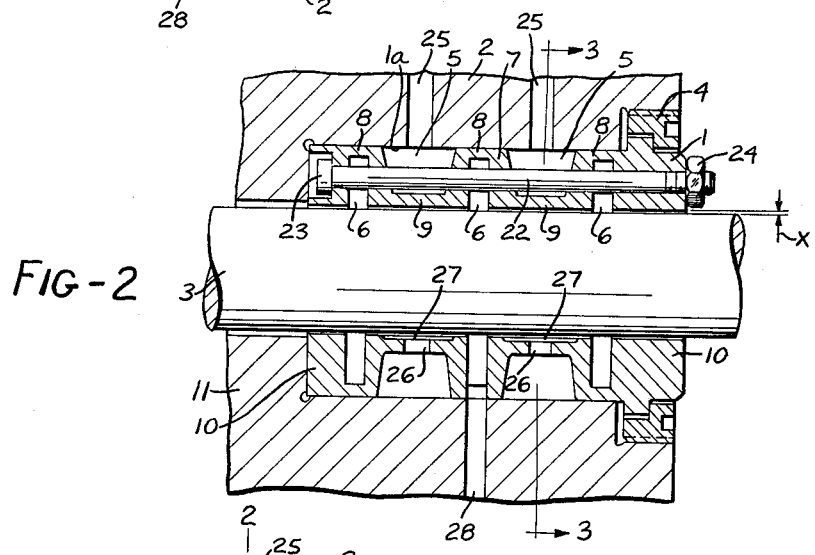
FIGURE 2 is a sectional view similar to FIGURE 1 but showing the adjusting ring in tightened position, said section being taken along line 2—2 of FIGURE 3.
Figure 3:
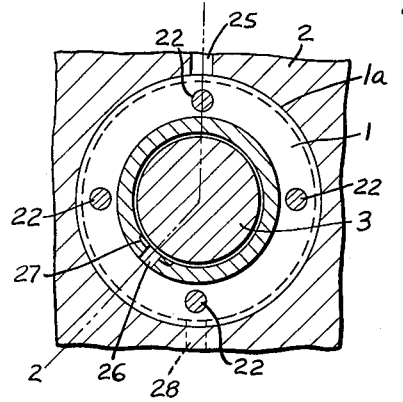
FIGURE 3 is a transverse sectional view taken along line 3—3 on FIGURE 2.

FIG. 2 shows the same journal-bearing bushing in its adjusted position so that the installation play between the bore of the housing and the outer surface of the bushing has been completely eliminated, whereas the play between the shaft and the bore 1a of the bushing has been adjusted in conformity with the desired requirements and, specifically to a dimension "X."

In conformity with the present invention, the adjustable journal-bearing bushing has its outer surface provided with two radial recesses or annular grooves 5 whereas the inner surface of the bushing is provided with three radial recesses or annular grooves 6. The radial recesses 5 and 6 are offset with regard to each other so that between said outer and inner recesses or grooves 5, 6 there will be formed supporting rings 7, outer bearing portions 8, inner bearing portions 9 the walls of which may be thicker than those of the bearing portions 8, and end rings 10. If now the threaded ring 4 is screwed in and tightened, the bushing 1 will abut the housing surface 11 and a dish spring-like deformation of the supporting rings 7 as well as a reduction in the length of the bushing 1 will occur. At the same time, the outer bearing surfaces 8 will rest against the bore 1a of the housing, and only after the threaded ring 4 is further tightened, will the bearing surfaces 9 due to their thicker walls narrow down to the desired running play.

When the threaded ring 4 is loosened, the journal-bearing bushing 1 tends to spring back to its original shape so that the original dimensions will be regained.

The number of the outer and inner recesses or grooves may, of course, vary and depends primarily on the load intended for the journal-bearing bushing.

The adjustable journal-bearing bushing according to the present invention is provided with four extension bars 22 extending therethrough in longitudinal direction of the bushing. The extension bars 22 have one end provided with a head 23 whereas the other end has threaded thereon a nut 24. These extension bars consist of a material, e.g. steel or lightmetals adapted to expand in response to heat development in the bearing to an extent greater than that of the other portions of the bearing. If now the desired running play $x$ is adjusted by means of the threaded ring 4, while the bearing is still in cold condition, and after all four nuts 24 have been brought into abutment without pre-stress (see FIG. 2), the threaded ring 4 is again loosened, whereupon the four expansion bars 22 will maintain the previously adjusted running play $x$. If now during the operation the bearing parts will heat up, the extension bars or pins 22 will expand as to their length to a greater extent than the bearing bushing will expand as to its length. This means that the journal-bearing bushing 1 will have the possibility to extend correspondingly and thereby to widen the running surface bore approximately to the extent of the growth of shaft 3 so that a uniform running play $x$ will be assured.

When the bearing cools down, for instance in view of a longer standstill period of the shaft, the extension pins will shorten, and the original condition will be restored.

The supply of lubricant is advantageously effected through bores 25 in the housing 2 which lead into the outer recesses 5 from where the lubricant will pass through bores 26 into wall pockets 27. The leakage oil collecting in the inner recesses 6 may discharge through a bore 28.

It is, of course, to be understood that the present invention is, by no means, limited to the particular constructions shown in the drawings but also comprises any modifications within the scope of the appended claims.

What I claim is:

A journal bearing bushing having a plurality of outer circumferential grooves and a plurality of inner circumferential grooves offset with regard to said outer circumferential grooves in axial direction of said bushing thereby subdividing said bushing into a plurality of annular outer bearing sections to be received in a bore of a supporting member and into a plurality of annular inner bearing sections for receiving a rotatable member to be journalled in said bushing, the peripheral wall thickness of said outer bearing sections being less than the peripheral wall thickness of said inner bearing sections whereby when said bushing is subjected to an axial force first the outer bearing sections are pressed radially outwardly and only thereafter in response to a further increase of such axial force the inner bearing sections are pressed radially inwardly, and a plurality of heat expandable pins arranged between the inner and outer periphery of said bushing and extending in longitudinal direction of said bushing from one end to the other end thereof.

References Cited in the file of this patent

FOREIGN PATENTS

| | | |
|---|---|---|
| 435,638 | Great Britain | Sept. 25, 1935 |
| 965,671 | Germany | June 13, 1957 |